(12) United States Patent
Liao et al.

(10) Patent No.: US 8,723,379 B2
(45) Date of Patent: May 13, 2014

(54) GEARED GENERATOR FOR AN ELECTRIC VEHICLE

(76) Inventors: Ho-Yo Liao, Changhua County (TW); Chen-Wei Liao, Changhua County (TW)

(\*) Notice: Subject to any disclaimer, the term of this patent is extended or adjusted under 35 U.S.C. 154(b) by 383 days.

(21) Appl. No.: 13/284,856

(22) Filed: Oct. 28, 2011

(65) Prior Publication Data
US 2013/0106115 A1 May 2, 2013

(51) Int. Cl.
| B62J 6/12 | (2006.01) |
| B62M 6/40 | (2010.01) |
| B62M 6/60 | (2010.01) |
| H02K 21/22 | (2006.01) |
| H02K 7/116 | (2006.01) |

(52) U.S. Cl.
USPC ............ 310/67 A; 180/65.1; 180/65.6; 310/83

(58) Field of Classification Search
USPC .................... 310/67 A; 180/65.51, 65.6–65.7
See application file for complete search history.

(56) References Cited

U.S. PATENT DOCUMENTS

| 6,007,447 A * | 12/1999 | Lin .............................. 475/149 |
| 7,749,121 B2 * | 7/2010 | Perng ................................ 475/5 |
| 8,210,974 B2 * | 7/2012 | Moeller ............................ 475/5 |
| 8,292,770 B2 * | 10/2012 | Novikov ........................... 475/5 |

FOREIGN PATENT DOCUMENTS

GB         2407216         *  4/2005    ............... H02K 7/18

\* cited by examiner

*Primary Examiner* — Burton Mullins
(74) *Attorney, Agent, or Firm* — Abe Hershkovitz; Hershkovitz & Associates, PLLC

(57) ABSTRACT

A geared generator for an electric vehicle has a body, a gearing device, a hub device and an electromotor. The body has two mounting boards, a battery and a commutator connected to the battery. The gearing device is connected to the body and has a primary tube, a minor tube, a gear-up segment, an output shaft, a mounting jacket, a stator mount and a motor stator. The gear-up segment is rotatably mounted between the gear disks and has three transmission shafts, three planet gear wheels and multiple bearings. The hub device is mounted around the tubes between the mounting boards and has two hub disks and a hub ring. The hub ring has a spacing disk and two side rings. The electromotor is connected to the gearing device and has a base, a coil stator, an eccentric flywheel, a fan and a protecting hood.

10 Claims, 5 Drawing Sheets

GEARED GENERATOR FOR AN ELECTRIC VEHICLE

BACKGROUND OF THE INVENTION

1. Field of the Invention

The present invention relates to a geared generator, and more particularly to a geared generator for an electric vehicle to generate electric power when the electric vehicle moves on a downhill path or a flat road and the electric vehicle is not working so as to improve the electricity generating efficiency of the electric vehicle.

2. Description of Related Art

A conventional electric vehicle has a motor to generate electric power to charge a battery that is mounted on the conventional electric vehicle and this can enable the conventional electric vehicles to move by the electric power of the battery. When the motor of the conventional electric vehicle is not working, the motor cannot generate electric power to charge the battery. The inertia rotary power of wheels and hubs of the conventional electric vehicle will be consumed by the friction force of the ground when the motor is not working and this will waste the mechanical energy of the conventional electric vehicle.

Therefore, the structure of the conventional electric vehicle cannot be used to charge the battery by the inertia rotary power of the conventional electric vehicle when the motor is not working on a downhill path or a flat road. As set forth, the conventional electric vehicle still has some problems to overcome.

A geared generator for an electric vehicle in accordance with the present invention mitigates or obviates the aforementioned problems.

SUMMARY OF THE INVENTION

The main objective of the invention is to provide a geared generator for an electric vehicle to enable the electric vehicle to generate electric power when the electric vehicle moves on a downhill path or a flat road and the electric vehicle is not working and can improve the electricity generating efficiency of the electric vehicle.

The geared generator for an electric vehicle in accordance with the present invention has a body, a gearing device, a hub device and an electromotor. The body has two mounting boards, a battery and a commutator connected to the battery. The gearing device is connected to the body and has a primary tube, a minor tube, a gear-up segment, an output shaft, a mounting jacket, a stator mount and a motor stator. The gear-up segment is rotatably mounted between the gear disks and has three transmission shafts, three planet gear wheels and multiple bearings. The hub device is mounted around the tubes between the mounting boards and has two hub disks and a hub ring. The hub ring has a spacing disk and two side rings. The electromotor is connected to the gearing device and has a base, a coil stator, an eccentric flywheel, a fan and a protecting hood.

Other objects, advantages and novel features of the invention will become more apparent from the following detailed description when taken in conjunction with the accompanying drawings.

DETAILED DESCRIPTION OF PREFERRED EMBODIMENT

Figure 1:
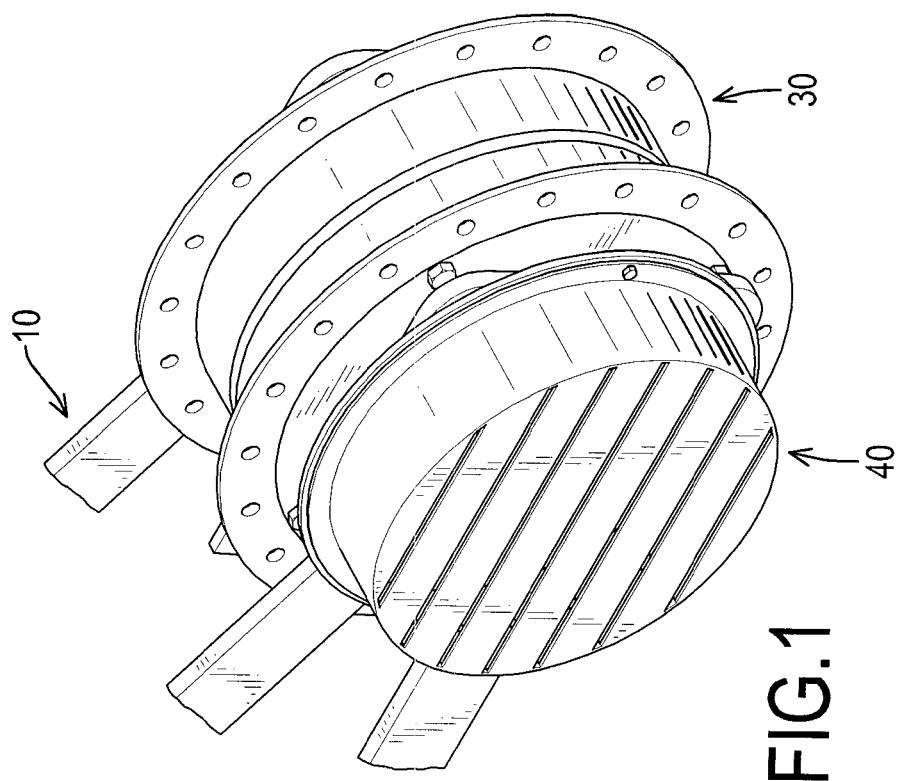
FIG. 1 is a perspective view of a geared generator for an electric vehicle in accordance with the present invention.

With reference to FIGS. 1 to 5, a geared generator for an electric vehicle in accordance with the present invention comprises a body 10, a gearing device 20, a hub device 30 and an electromotor 40.

The body 10 has two mounting boards 11, a battery 13 and a commutator 14. The mounting boards 11 face each other at an interval, and each mounting board 11 has a bottom edge and a mounting recess 12. The mounting recess 12 is formed in the bottom edge of the mounting board 11. Preferably, the mounting boards 11 include a first mounting board 11 and a second mounting board 11. The battery 13 is mounted on the body 10. The commutator 14 is mounted on the body 10, is electrically connected to the battery 13 and has a conducting wire 141. The conducting wire 141 is electrically connected to the battery 13.

Figure 2:
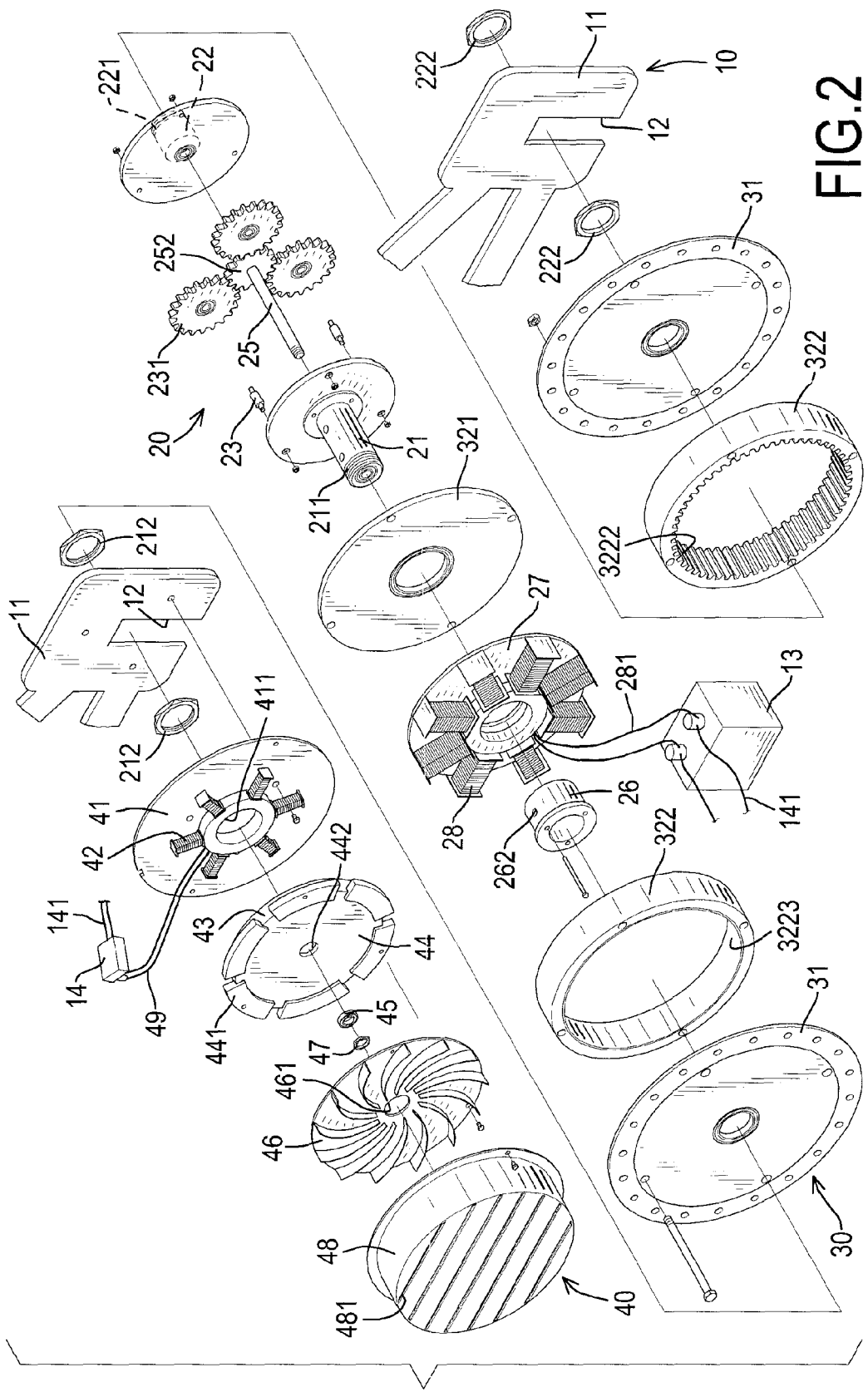
FIG. 2 is an exploded perspective view of the geared generator for an electric vehicle in FIG. 1.
Figure 3:
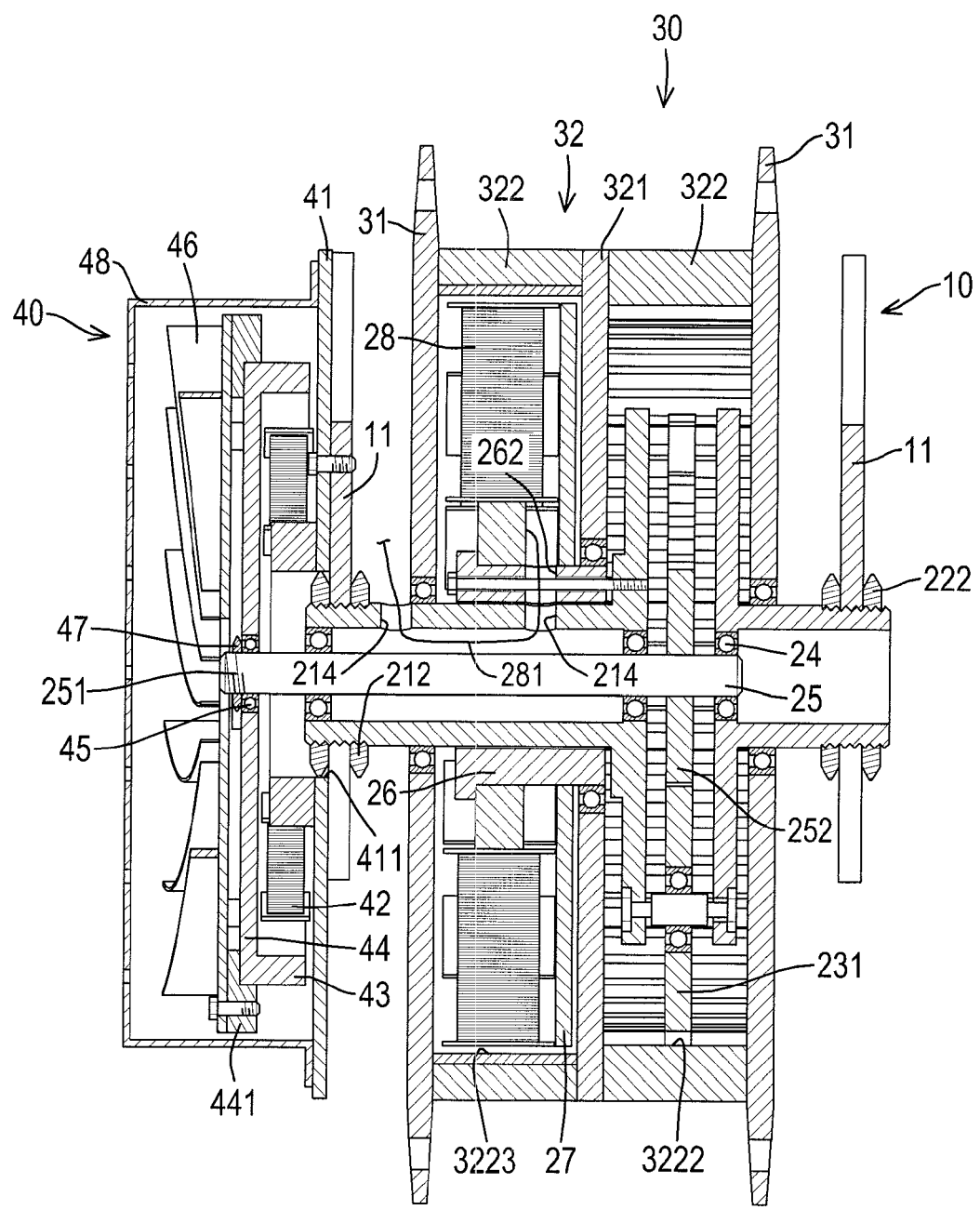
FIG. 3 is an enlarged side view in partial section of the geared generator for an electric vehicle in FIG. 1.
Figure 4:
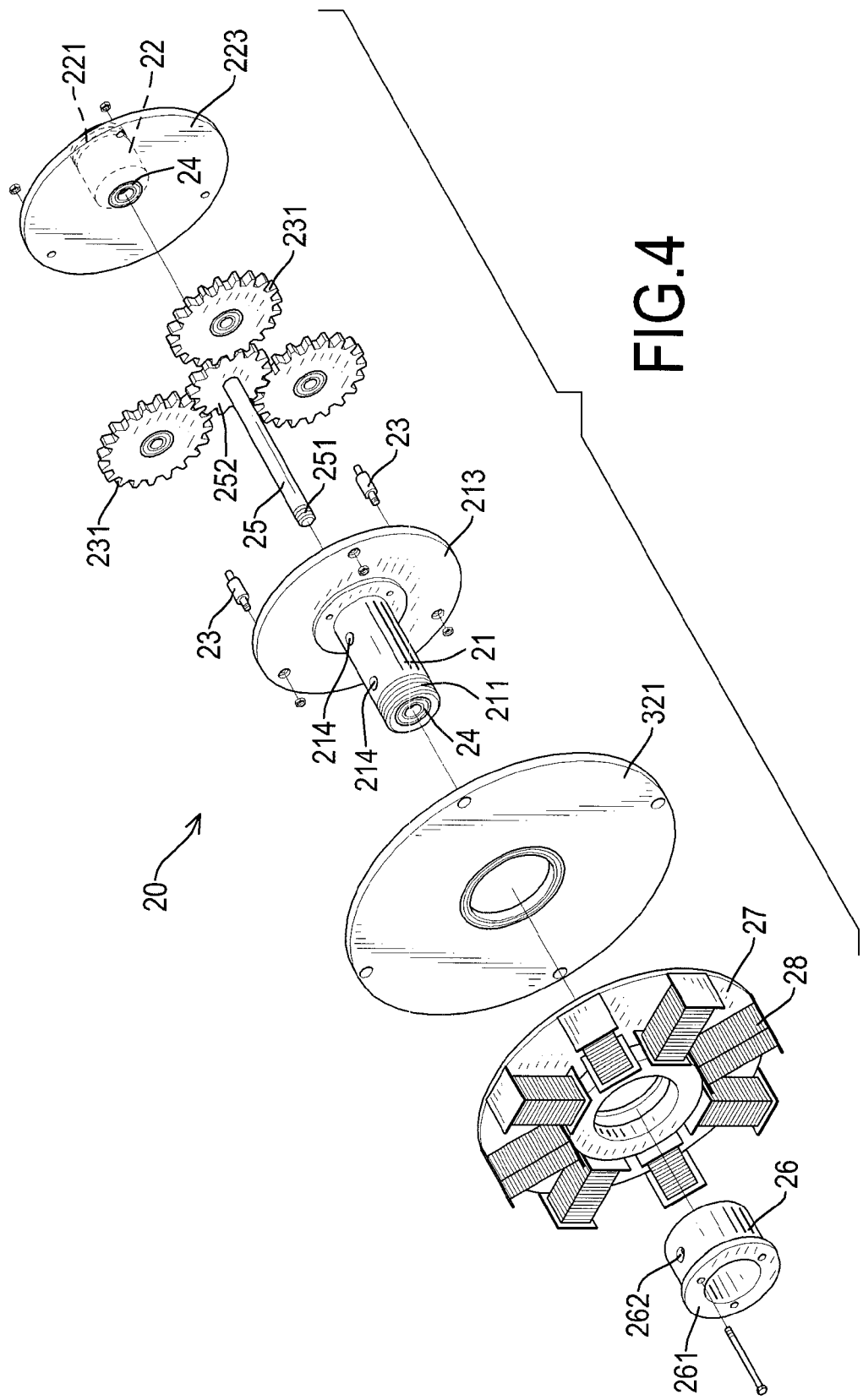
FIG. 4 is an enlarged and exploded perspective view of the gearing generator for an electric vehicle in FIG. 2.

With reference to FIGS. 2 to 4, the gearing device 20 is connected to the body 10 and has a primary tube 21, a minor tube 22, a gear-up segment, an output shaft 25, a mounting jacket 26, a stator mount 27 and a motor stator 28.

The primary tube 21 is a hollow tube, is mounted transversally in the mounting recess 12 of the first mounting board 11 and has an inner end, an outer end, an external surface, an outer thread 211, two screw nuts 212, a gear disk 213 and two cord holes 214. The inner end of the primary tube 21 extends between the mounting boards 11. The outer end of the primary tube 21 extends out of the first mounting board 11. The outer thread 211 is formed around the external surface of the primary tube 21 at the outer end of the primary tube 21. The screw nuts 212 are screwed with the outer thread 211 of the primary tube 21 beside the first mounting board 11 and press against the corresponding mounting board 11 to hold the primary tube 21 securely with the first mounting board 11. The gear disk 213 may be circular, is formed on the inner end of the primary tube 21 between the mounting boards 11 and has an inner side facing the second mounting board 11. The cord holes 214 are formed through the external surface of the primary tube 21 at an interval between the ends of the primary tube 21.

The minor tube 22 is mounted transversally in the mounting recess 12 of the second mounting board 11, aligns with the primary tube 21 and has an inner end, an outer end, an external surface, an outer thread 221, two screw nuts 222 and a gear disk 223. The inner end of the minor tube 22 extends between the mounting boards 11 and faces the gear disk 213 of the primary tube 21. The outer end of the minor tube 22 extends out of the second mounting board 11. The outer thread 221 is formed around the external surface of the minor tube 22 at the outer end of the minor tube 22. The screw nuts 222 are screwed with the outer thread 221 of the minor tube 22 beside the second mounting board 11 and press against the second mounting board 11 to hold the minor tube 22 securely with the corresponding board 11. Then, the gearing device 20 can be held securely with the body 10 between the mounting boards 11. The gear disk 223 is formed on the inner end of the minor tube 22 between the mounting boards 11, corresponding to the gear disk 213 of the primary tube 21 and has an inner side facing the inner side of the gear disk 213 of the primary tube 21.

The gear-up segment is rotatably mounted between the gear disks 213, 223 of the tubes 21, 22 of the gearing device 20 and has three transmission shafts 23, three planet gear wheels 231 and three bearings 24. The transmission shafts 23 are mounted between the inner sides of the gear disks 213, 223 of the tubes 21, 22 at intervals. The planet gear wheels 231 are rotatably and respectively mounted around the transmission shafts 23 between the inner sides of the gear disks 213, 223. The bearings 24 are respectively mounted in the inner ends of the tubes 21, 22 and the outer end of the primary tube 21.

The output shaft 25 is mounted in the tubes 21, 22 between the bearings 24 and has an inner end, an outer end, an external surface, a positioning thread 251 and a sun gear wheel 252. The inner end of the output shaft 25 is mounted in the bearing 24 that is mounted in the inner end of the minor tube 22. The outer end of the output shaft 25 extends out of the outer end of the primary tube 21. The positioning thread 251 is formed around the external surface of the output shaft 25 at the outer end of the output shaft 25. The sun gear wheel 252 is securely mounted around the output shaft 25 near the inner end of the output shaft 25 and engages the planet gear wheels 231 of the gear-up segment.

The mounting jacket 26 is mounted around the primary tube 21, is securely connected to the gear disk 213 of the primary tube 21 by fasteners and has an inner end, an outer end, an external surface, a positioning flange 261 and a cord hole 262. The inner end of the mounting jacket 26 is securely connected to the gear disk 213 of the primary tube 21. The outer end of the mounting jacket 26 extends between the cord holes 214 of the primary tube 21. The positioning flange 261 is formed on and protrudes from the external surface of the mounting jacket 26 at the outer end of the mounting jacket 26. The cord hole 262 is formed through the external surface of the mounting jacket 26 and communicates with one of the cord holes 214 of the primary tube 21.

The stator mount 27 is mounted around the mounting jacket 26, abuts the positioning flange 261 and has an outer side and a diameter. The outer side of the stator mount 27 faces the positioning flange 261 of the mounting jacket 26. The motor stator 28 is mounted on the outer side of the stator mount 27 around the mounting jacket 26, is electrically connected to the battery 13 of the body 10 and has a power cord 281. The power cord 281 is electrically connected to the motor stator 28, extends out of the primary tube 21 via the cord holes 262, 214 of the mounting jacket 26 and the primary tube 21 and is electrically connected to the battery 13 of the body 10.

Figure 5:
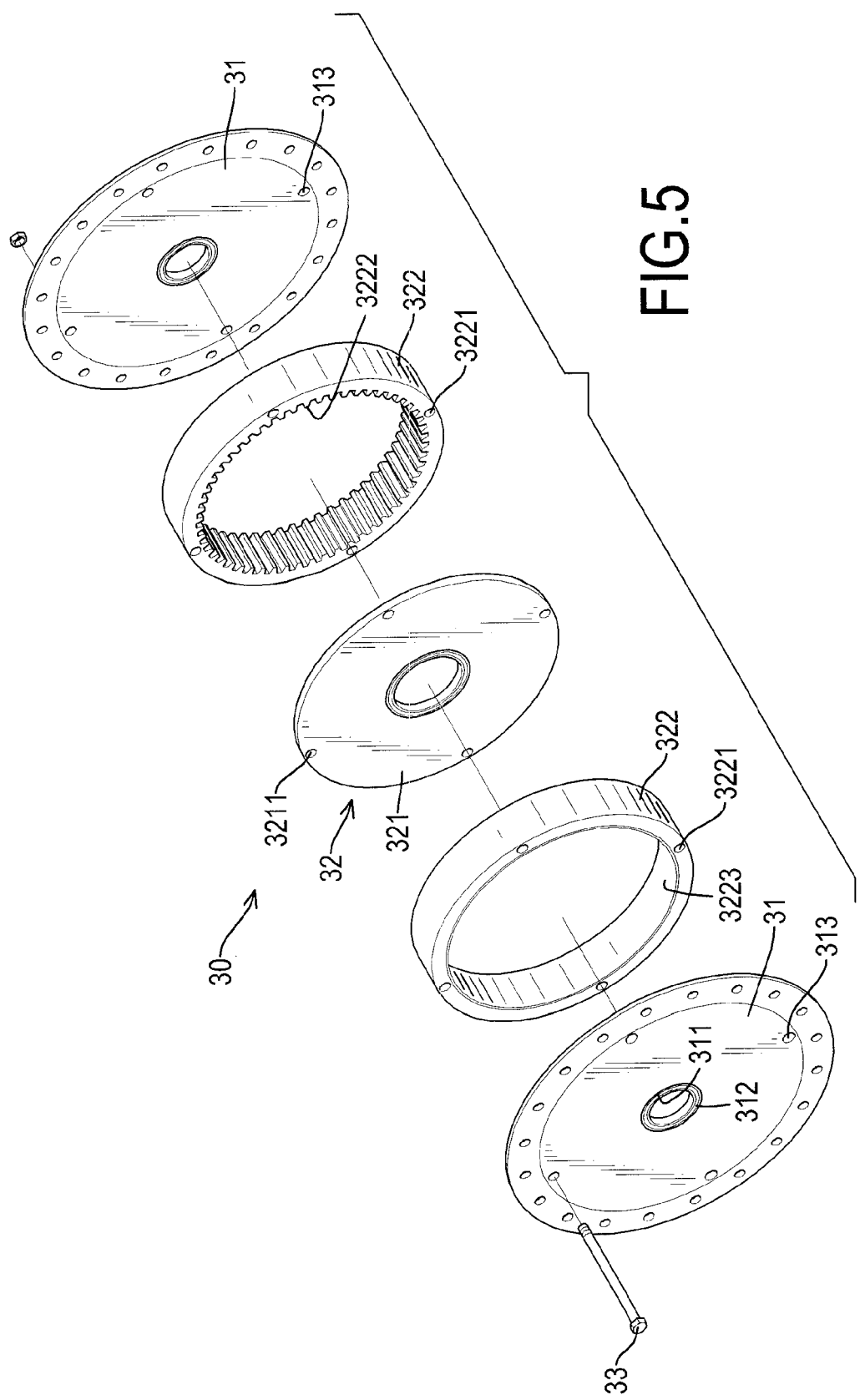
FIG. 5 is another enlarged and exploded perspective view of the geared generator for an electric vehicle in FIG. 2.

With reference to FIGS. 2, 3 and 5, the hub device 30 is mounted around the tubes 21, 22 of the gearing device 20 between the mounting boards 11 of the body 10 and has two hub disks 31, a hub ring 32 and multiple bolt-nut groups 33. The hub disks 31 are respectively mounted around the tubes 21, 22 of the gearing device 20 between the mounting boards 11 of the body 10, and each hub disk 31 has a center, a diameter, a mounting hole 311, an unidirectional bearing 312 and multiple through holes 313. The mounting hole 311 is formed through the center of the hub disk 31. The unidirectional bearing 312 is mounted in the mounting hole 311 of the hub disk 31. The unidirectional bearing 312 of one of the hub disks 31 is mounted around the primary tube 21 between the mounting jacket 26 and the cord hole 214 that is formed near the outer end of the primary tube 21 and the unidirectional bearing 312 of the other hub disk 31 is mounted around the minor tube 22 near the gear disk 223 of the minor tube 22. The through holes 313 are formed through the hub disk 31 around the mounting hole 311 at intervals and align with the through holes 313 of the other hub disk 31.

The hub ring 32 is mounted around the tubes 21, 22 of the gear device 20 between the hub disks 31 and has a spacing disk 321 and two side rings 322. The spacing disk 321 is rotatably mounted around the inner end of the mounting jacket 26 and has a diameter and multiple through holes 3211. The diameter of the spacing disk 321 is larger than the diameter of the stator mount 27 and is smaller than the diameters of the hub disks 31. The through holes 3211 are formed through the spacing disk 321 and align with the through holes 313 of the hub disks 31. The side rings 322 are respectively mounted around the tubes 21, 22 of the gearing device 20 between the hub disks 31 and the spacing disk 321 of the hub ring 32, and each side ring 322 has a diameter, two sides, an internal surface and multiple through holes 3221. The diameters of the side rings 322 are same as the diameter of the spacing disk 321. The sides of the side ring 322 respectively abut the spacing disk 321 and one of the hub disks 31. The through holes 3221 are formed through the sides of the side ring 322 and align with the through holes 3211, 313 of the spacing disk 321 and the hub disks 31 and the through holes 3221 of the other side ring 322. The side ring 322 that is mounted around the minor tube 22 further has multiple engaging teeth 3222 formed around and protruding from the internal surface of the side ring 322 and engaging the planet gear wheels 231 of the gear-up segment of the gearing device 20. The side ring 322 that is mounted around the primary tube 21 further has a permanent-magnet rotor 3223 being annular, mounted on the internal surface of the side ring 322 around the motor stator 28 of the gearing device 20.

The bolt-nut groups 33 are respectively mounted through the through holes 313, 3221, 3211 of the hub disks 31, the side rings 322 and the spacing disk 321 to connect the hub ring 32 securely with the hub disks 31.

With reference to FIGS. 2 and 3, the electromotor 40 is connected to the gearing device 20 and has a base 41, a coil stator 42, an eccentric flywheel 44, a fan 46, a protecting hood 48 and a leading wire 49.

The base 41 is securely mounted on the first mounting board 11 by fasteners and has a center, an inner side, an outer side and a base hole 411. The inner side of the base 41 is securely mounted on the first mounting board 11 of the body 10. The base hole 411 is formed through the center of the base 41 to enable the outer ends of the primary tube 21 and the output shaft 25 to extend through the base 41. The coil stator 42 is mounted on the outer side of the base 41 around the base hole 411 of the base 41.

The eccentric flywheel 44 is mounted on the output shaft 25 beside the coil stator 42, is opposite to the base 41 and has an inner side, an outer side, a periphery, a center, a flywheel hole 442, a unidirectional bearing 45, a positioning nut 47, a permanent-magnet rotor 43 and multiple weighted blocks 441. The inner side of the eccentric flywheel 44 faces the coil stator 42. The flywheel hole 442 is formed through the center of the eccentric flywheel 44 and is mounted around the output shaft 25 near the outer end of the output shaft 25. The unidirectional bearing 45 is mounted in the flywheel hole 442 and is mounted around the output shaft 25. The positioning nut 47 is screwed with the outer thread 251 of the outer shaft 25, abuts against the unidirectional bearing 45 to prevent the unidirectional bearing 45 from escaping out of the output shaft 25. The permanent-magnet rotor 43 is annular and is mounted on and protrudes form the inner side of the eccentric flywheel 44 around the coil stator 42. The weighted blocks 441 are mounted on the outer side of the eccentric flywheel 44 at intervals around the periphery of the eccentric flywheel 44.

The fan 46 is mounted around the outer end of the output shaft 25, is securely connected to the eccentric flywheel 44 to rotate with the eccentric flywheel 44 and abuts the weighted blocks 441 and has an inner side, an outer side, a center and a fan hole 461. The inner side of the fan 46 securely abuts with the weighted blocks 441 by the fan 46 securely connected to the eccentric flywheel 44. The fan hole 461 is formed through the center of the fan 46 and is mounted around the outer end of the output shaft 25.

The protecting hood 48 is mounted securely on the outer side of the base 41 by fasteners and is mounted around the coil stator 42, the eccentric flywheel 44 and the fan 46 and has an outer side and multiple eliminating holes 481. The eliminating holes 481 are elongated and are formed through the outer side of the protecting hood 48 at intervals to eliminate heat generated between the base 41 and the protecting hood 48. The leading wire 49 is electrically connected to the coil stator 42 and the commutator 14 of the body 10 to transport the alternating current into the commutator 14. Then, the commutator 14 will transfer the alternating current into a direct current and transport the direct current into the battery 13 of the body 10. Furthermore, the electromotor 40 also can be selectively mounted on the second mounting board 11 and the positions of the gearing device 20 and the hub device 30 are exchanged.

In operation, with reference to FIGS. 2 and 3, when using the geared generator in accordance with the present invention in an electric vehicle, a tire of the electric vehicle is mounted around the hub device 30 and the battery 13 supplies electric power to the motor stator 28 to enable the motor stator 28 to rotate. Then, the hub device 30 and the tire will be rotated with the motor stator 28. When the hub device 30 is rotated with the motor stator 28, the planet gear wheels 231 will rotate relative to the gear disks 213, 223 of the tubes 21, 22 by the engagement between the engaging teeth 3222 of the hub ring 32 and the planet gear wheels 231.

By the engagement between the planet gear wheels 231 and the sun gear wheel 252, the output shaft 25 is rotated with the planet gear wheels 231 at a higher speed relative to the tubes 21, 22. The permanent-magnet rotor 43 of the electromotor 40 is rotated with the output shaft 25 via the unidirectional bearing 45 of the electromotor 40. When the permanent-magnet rotor 43 of the electromotor 40 is rotated relative to the coil stator 42, an alternating current is generated by the electromagnetic effect between the coil stator 42 and the permanent-magnet rotor 43 of the electromotor 40. The alternating current will be transported to and transformed into a direct current by the commutator 14 via the leading wire 49. Then, the direct current will be led to the battery 13 via the conducting wire 141 to provide a charging effect to the battery 13 of the body 10 and this can reduce the power consumption of the battery 13 when provides electric power to the motor stator 28 to enable the hub device 30 to rotate with the motor stator 28.

When the electric vehicle is assembled with the geared generator in accordance with the present invention, the output shaft 25 still rotates with the hub device 30 and the tire of the electric vehicle via the gearing segment of the gearing device 20 to enable the output 25 to output power and provide a charging effect to the battery 13 even the if electric vehicle moves on a downhill path and the electric vehicle is not working. When the electric vehicle moves on a flat road or a deceleration state, the accelerated velocity of the electric vehicle and the rotating speed of the output shaft 25 are reduced, the rotating speed of the output shaft 25 is lower than the inertial rotating speed of the eccentric flywheel 44, the inertial rotation of the eccentric flywheel 44 will not be limited by the output shaft 25 and the eccentric flywheel 44 will rotate relative to the output shaft 25 by the unidirectional bearing 45 and the weighted blocks 441 to enable the permanent-magnet rotor 43 to rotate relative to the coil stator 42 to generate electric power. Therefore, the permanent-magnet rotor 43 of the electromotor 40 can be rotated with the eccentric flywheel 44 to generate electric power when the rotating speed of the output shaft 25 is reduced and this can increase the electricity generating efficiency of the electric vehicle to increase the running distance of the electric vehicle and to reduce the frequency of charging.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A geared generator for an electric vehicle comprising:
   a body having
      two mounting boards facing each other at an interval and including a first mounting board and a second mounting board;
      a battery mounted on the body; and
      a commutator mounted on the body and electrically connected to the battery;
   a gearing device connected to the body and having
      a primary tube being a hollow tube, mounted transversally in the first mounting boards and having
         an inner end extending between the mounting boards;
         an outer end extending out of the first mounting board; and
         a gear disk formed on the inner end of the primary tube between the mounting boards and having an inner side facing the second mounting board;
      a minor tube mounted transversally in the second mounting board, aligning with the primary tube and having
         an inner end extending between the mounting boards and facing the gear disk of the primary tube;
         an outer end extending out of the second mounting board; and
         a gear disk formed on the inner end of the minor tube between the mounting boards, corresponding to the gear disk of the primary tube and having an inner side facing the inner side of the gear disk of the primary tube;
      a gear-up segment rotatably mounted between the gear disks of the tubes of the gearing device and having
         three transmission shafts mounted between the inner sides of the gear disks of the tubes of the gearing device at intervals;
         three planet gear wheels rotatably and respectively mounted around the transmission shafts between the inner sides of the gear disks; and
         multiple bearings mounted in the tubes of the gearing device;
      an output shaft mounted in the tubes between the bearings and having
         an inner end mounted in the inner end of the minor tube;

an outer end extending out of the outer end of the primary tube; and a sun gear wheel securely mounted around the output shaft near the inner end of the output shaft and engaging the planet gear wheels of the gear-up segment;

a mounting jacket mounted around the primary tube, securely connected to the gear disk of the primary tube and having an inner end securely connected to the gear disk of the primary tube; and an outer end;

a stator mount mounted around the mounting jacket and having an outer side facing the outer end of the mounting jacket; and a motor stator mounted on the outer side of the stator mount around the mounting jacket and electrically connected to the battery of the body;

a hub device mounted around the tubes of the gearing device between the mounting boards of the body and having two hub disks respectively mounted around the tubes of the gearing device between the mounting boards of the body and each hub disk having a center;

a mounting hole formed through the center of the hub disk; and an unidirectional bearing mounted in the mounting hole of the hub disk; and a hub ring mounted around the tubes of the gear device between the hub disks and having a spacing disk rotatably mounted around the inner end of the mounting jacket;

two side rings respectively mounted around the tubes of the gearing device between the hub disks and the spacing disk of the hub ring and each side ring having two sides respectively abutting the spacing disk and one of the hub disks; and an internal surface;

multiple engaging teeth formed around and protruding from the internal surface of the side ring that is mounted around the minor tube and engaging the planet gear wheels of the gear-up segment of the gearing device; and a permanent-magnet rotor being annular, mounted on the internal surface of the side ring that being mounted around the primary tube around the motor stator of the gearing device; and an electromotor connected to the gearing device and having a base securely mounted on the first mounting board and having a center;

an inner side securely mounted on the first mounting board of the body;

an outer side; and a base hole formed through the center of the base to enable the outer ends of the primary tube and the output shaft to extend through the base;

a coil stator mounted on the outer side of the base around the base hole of the base;

an eccentric flywheel mounted on the output shaft beside the coil stator, being opposite to the base and having an inner side facing the coil stator;

an outer side;

a periphery;

a center;

a flywheel hole formed through the center of the eccentric flywheel and mounted around the output shaft near the outer end of the output shaft;

a unilateral bearing mounted in the flywheel hole and mounted around the output shaft;

a permanent-magnet rotor being annular and mounted on and protruding form the inner side of the eccentric flywheel around the coil stator; and multiple weighted blocks mounted on the outer side of the eccentric flywheel at intervals around the periphery of the eccentric flywheel;

a fan mounted around the outer end of the output shaft, securely connected to the eccentric flywheel to rotate with the eccentric flywheel and abutting the weighted blocks and having an inner side securely abutting with the weighted blocks; and an outer side; and a protecting hood mounted securely on the outer side of the base and mounted around the coil stator, the eccentric flywheel and the fan and having an outer side; and multiple eliminating holes being elongated and formed through the outer side of the protecting hood at intervals to eliminate heat generated between the base and the protecting hood.

2. The geared generator for an electric vehicle as claimed in claim 1, wherein the gear-up segment has three bearings respectively mounted in the inner ends of the tubes and the outer end of the primary tube;

the inner end of the output shaft is mounted in the bearing that is mounted in the inner end of the minor tube; and the base is securely mounted on the first mounting board by fasteners.

3. The geared generator for an electric vehicle as claimed in claim 2, wherein the primary tube has an external surface; and two cord holes formed through the external surface of the primary tube at an interval between the ends of the primary tube;

the outer end of the mounting jacket extends between the cord holes of the primary tube;

the mounting jacket is mounted around the primary tube, is securely connected to the gear disk of the primary tube by fasteners and has an external surface;

a positioning flange formed on and protruding from the external surface of the mounting jacket at the outer end of the mounting jacket; and a cord hole formed through the external surface of the mounting jacket and communicating with one of the cord holes of the primary tube;

the stator mount abuts the positioning flange and has an outer side facing the positioning flange of the mounting jacket;

the motor stator has a power cord electrically connected to the motor stator, extending out of the primary tube via the cord holes of the mounting jacket and the primary tube and electrically connected to the battery of the body;

the unidirectional bearing of one of the hub disks is mounted around the primary tube between the mounting jacket and the cord hole that is formed near the outer end of the primary tube; and the unidirectional bearing of the other hub disk is mounted around the minor tube near the gear disk of the minor tube.

4. The geared generator for an electric vehicle as claimed in claim 3, wherein
the stator mount has a diameter;
each hub disk has
a diameter; and
multiple through holes formed through the hub disk around the mounting hole at intervals and aligning with the through holes of the other hub disk;
the spacing disk has
a diameter being larger than the diameter of the stator mount and being smaller than the diameters of the hub disks; and
multiple through holes formed through the spacing disk and aligning with the through holes of the hub disks;
each side ring has
a diameter being same as the diameter of the spacing disk; and
multiple through holes formed through the sides of the side ring and aligning with the through holes of the spacing disk and the hub disks and the through holes of the other side ring; and
the hub device has multiple bolt-nut groups respectively mounted through the through holes of the hub disks, the side rings and the spacing disk to connect the hub ring securely with the hub disks.

5. The geared generator for an electric vehicle as claimed in claim 4, wherein
each mounting board having
a bottom edge; and
a mounting recess formed in the bottom edge of the mounting board and mounted on one of the tubes of the gearing device;
the primary tube is mounted transversally in the mounting recess of the first mounting board and has
an outer thread formed around the external surface of the primary tube at the outer end of the primary tube; and
two screw nuts screwed with the outer thread of the primary tube beside the first mounting board and pressing against the first mounting board 1 to hold the primary tube securely with the first mounting board; and
the minor tube is mounted transversally in the mounting recess of the second mounting board and has
an external surface;
an outer thread formed around the external surface of the minor tube at the outer end of the minor tube;
two screw nuts crewed with the outer thread of the minor tube beside the second mounting board and pressing against the second mounting board to hold the minor tube securely with the second mounting board; and
the gearing device is held securely with the body between the mounting boards by the screw nuts of the tubes of the gearing device.

6. The geared generator for an electric vehicle as claimed in claim 5, wherein
the output shaft has
an external surface; and
a positioning thread formed around the external surface of the output shaft at the outer end of the output shaft;
the eccentric flywheel has a positioning nut screwed with the outer thread of the outer shaft and abutting against the unidirectional bearing to prevent the unidirectional bearing from escaping out of the output shaft; and
the fan has a center; and
a fan hole formed through the center of the fan and mounted around the outer end of the output shaft.

7. The geared generator for an electric vehicle as claimed in claim 6, wherein
the commutator has a conducting wire electrically connected to the battery; and
the electromotor has a leading wire electrically connected to the coil stator and the commutator of the body to transport the alternating current into the commutator.

8. The geared generator for an electric vehicle as claimed in claim 1, wherein
each mounting board having
a bottom edge; and
a mounting recess formed in the bottom edge of the mounting board and mounted on one of the tubes of the gearing device;
the primary tube is mounted transversally in the mounting recess of the first mounting board and has
an outer thread formed around the external surface of the primary tube at the outer end of the primary tube; and
two screw nuts screwed with the outer thread of the primary tube beside the first mounting board and pressing against the first mounting board to hold the primary tube securely with the first mounting board; and
the minor tube is mounted transversally in the mounting recess of the second mounting board and has
an external surface;
an outer thread formed around the external surface of the minor tube at the outer end of the minor tube;
two screw nuts crewed with the outer thread of the minor tube beside the second mounting board and pressing against the second mounting board to hold the minor tube securely with the second mounting board; and
the gearing device is held securely with the body between the mounting boards by the screw nuts of the tubes of the gearing device.

9. The geared generator for an electric vehicle as claimed in claim 2, wherein
each mounting board having
a bottom edge; and
a mounting recess formed in the bottom edge of the mounting board and mounted on one of the tubes of the gearing device;
the primary tube is mounted transversally in the mounting recess of the first mounting board and has
an outer thread formed around the external surface of the primary tube at the outer end of the primary tube; and
two screw nuts screwed with the outer thread of the primary tube beside the first mounting board and pressing against the first mounting board to hold the primary tube securely with the first mounting board; and
the minor tube is mounted transversally in the mounting recess of the second mounting board and has
an external surface;
an outer thread formed around the external surface of the minor tube at the outer end of the minor tube;
two screw nuts crewed with the outer thread of the minor tube beside the second mounting board and pressing against the second mounting board to hold the minor tube securely with the second mounting board; and
the gearing device is held securely with the body between the mounting boards by the screw nuts of the tubes of the gearing device.

10. The geared generator for an electric vehicle as claimed in claim 3, wherein
each mounting board having
a bottom edge; and
a mounting recess formed in the bottom edge of the mounting board and mounted on one of the tubes of the gearing device;
the primary tube is mounted transversally in the mounting recess of the first mounting board and has
an outer thread formed around the external surface of the primary tube at the outer end of the primary tube; and
two screw nuts screwed with the outer thread of the primary tube beside the first mounting board and pressing against the first mounting board to hold the primary tube securely with the first mounting board; and
the minor tube is mounted transversally in the mounting recess of the second mounting board and has
an external surface;
an outer thread formed around the external surface of the minor tube at the outer end of the minor tube;
two screw nuts crewed with the outer thread of the minor tube beside the second mounting board and pressing against the second mounting board to hold the minor tube securely with the second mounting board; and
the gearing device is held securely with the body between the mounting boards by the screw nuts of the tubes of the gearing device.

* * * * *